United States Patent [19]
Guerga et al.

[11] 3,732,048
[45] May 8, 1973

[54] APPARATUS FOR CASTING OF CERAMICS

[75] Inventors: Michel Henri Guerga, Bois; Bernard Lucien Desire Hallier, La Varenne, both of France

[73] Assignee: International Standard Electric Corporation, New York, N.Y.

[22] Filed: Feb. 8, 1971

[21] Appl. No.: 113,483

[30] Foreign Application Priority Data

Dec. 18, 1970 France..........................7005727

[52] U.S. Cl..................425/174.4, 25/132, 25/142 A, 264/25
[51] Int. Cl. ...........................H05b 9/00, B28b 1/26
[58] Field of Search..........................425/174, 174.4; 249/78; 25/132, 142 A; 34/1; 264/25, 26, DIG. 46

[56] References Cited

UNITED STATES PATENTS

| | | | |
|---|---|---|---|
| 3,474,544 | 10/1969 | Holden et al. | 34/1 |
| 3,585,258 | 6/1971 | Levinson | 264/25 X |
| 3,519,517 | 7/1970 | Dench | 264/26 X |
| 3,192,291 | 6/1965 | D'Onofrio | 264/26 |
| 3,426,439 | 2/1969 | Ryman | 34/1 |

FOREIGN PATENTS OR APPLICATIONS

| | | | |
|---|---|---|---|
| 653,232 | 5/1951 | Great Britain | 264/86 |
| 831,769 | 3/1960 | Great Britain | 25/142 A |

OTHER PUBLICATIONS

"Drying Ceramic Products By Use of Induced High Frequency Electrical Energy," Vaughen et al., Journal American Ceramic Society 22(9), pp. 281–284 1939 pp. 2–22

Primary Examiner—J. Spencer Overholser
Assistant Examiner—Ben D. Tobor
Attorney—C. Cornell Remsen, Jr., Walter J. Baum, Paul W. Hemminger, Charles L. Johnson, Philip M. Bolton, Isidore Togut, Edward Goldberg and Menotti J. Lombardi, Jr.

[57] ABSTRACT

Ceramic articles are cast in plaster molds using a combination of microwave heating and air ventilation. A mold is filled with a slurry and positioned in a cavity having sources of microwave energy to heat the material to a desired temperature. A ventilation device then supplies cool pulsed air to the external surface of the mold to set the slurry. Excess slurry is emptied, further microwave heating applied and cooler air directed into the interior of the mold to harden the paste. The molds are then removed and dried with hot air for reuse. Homogeneous drying minimizes cracking and the processing time is greatly reduced.

4 Claims, 6 Drawing Figures

3,732,048

APPARATUS FOR CASTING OF CERAMICS

BACKGROUND OF THE INVENTION

1. Field of the Invention

The present invention concerns a process and apparatus for microwave heating in the production of ceramic objects made from a slurry as used in the casting method. It is employed in the manufacture of sanitary objects of large dimensions such as wash basins, lavatories and bidets and provides improved drying in less time by a combination of microwave heating and cool air ventilation of the molds containing the slurry.

2. Description of the Prior Art

In the present production of sanitary objects a slurry is used which is an aqueous suspension of the constituents of the ceramic paste having the consistency of a creamy liquid. According to known processes the following operations are carried out successively: The casting or filling of a piece includes first pouring the slurry into a porous plaster mold, the internal form of which is the external form of the object to be reproduced. The water of the slurry is slowly absorbed in the plaster and a layer of soft and smooth paste is thus formed on the internal surface of the mold. At the end of a certain time which depends on the porosity of the plaster, on the density of the slurry, on the predetermined humidity of the mold and on the difference of temperature between the paste and the mold, the thickness of the layer becomes sufficient, the slurry is set and the excess of the slurry is emptied by an orifice opened at the lower part of the mold. Lastly, during a long period of hardening, the layer of paste continues to be dehydrated by migration of the moisture towards the plaster, shrinks somewhat and detaches itself from the mold. The mold, made up for example, of several parts held together by a joint, is then opened and the piece thus "cast" is removed, being rigid enough to be fed, on suitable supports, to the final drying.

The major disadvantage of the traditional processes of natural dehydration, without intervention of external agents, resides in the considerable duration of the hardening which can exceed 24 hours. More modern processes which use a forced ventilation of the molds by hot air, still require long times. By way of example, for a wash basin, the total duration of the operation from the start of the filling of the mold with the slurry up to the end of removal from the mold is of the order of 7½ hours of which about 2 hours is for the time of set and 5 hours for the hardening. In a modern production line, with a large output of pieces, the stations at which the setting and hardening of the paste take place may become strangling production bottle necks if the number of molds is insufficient. It is then necessary to multiply the number of molds, which are costly objects, to considerably increase the work and storage surfaces as well as the surface reserved for the drying of the molds which are at rest between two periods of service.

SUMMARY OF THE INVENTION

The object of the present invention is to provide a process which overcomes these disadvantages by reducing the durations of setting and hardening by the use of microwaves for rapid heating of the slurry or the paste through dielectric losses.

Another object of the invention is to fix the optima conditions of the treatment of the slurry and of the paste, combining the microwave heating, the absorption of the porous mold and the ventilation by pulsed air.

Another object of the invention is to provide an apparatus for carrying out the process, including one or more cavities in which are placed the mold or molds and in which several sources of microwave energy radiate.

Another object of the invention is the provision of a complete simplified installation operating in continuous fashion in a closed cycle with a reduced number of molds for the preparation of objects of dried ceramic paste starting from a slurry.

According to the invention, the slurry or paste is heated rapidly and selectively by microwaves and ventilation at the exterior of the mold by relatively cold air increases the speed of migration of the liquid towards the mold and avoids too rapid deterioration of the plaster. The plaster mold is filled with slurry in a known manner, then placed during a first short time $t_1$ under a first cavity in which a first assembly of microwave sources radiate to raise the temperature of the slurry to a temperature $\theta_1$. The microwave radiation is then interrupted and the mold subjected externally to ventilation of relatively cold pulsed air at a temperature $\theta_2$ during a time $t_2$ clearly longer than $t_1$. At the end of the time $t_1 + t_2$ the slurry setting operation is completed. The speed of migration of the moisture from the slurry towards the plaster is proportional to the temperature difference $\theta_1 - \theta_2$. The duration $t_2$ is a function of the thickness of the pasty layer that it is desired to obtain inside the mold. The temperature $\theta_1$ is chosen as high as possible but must remain less than a limit of the order of 65° C, beyond which the slurry and the plaster in parts of the mold in contact with it, risk deterioration by physicochemical transformation.

According to another feature of the invention, the mold enclosing the paste deposited on these surfaces is first emptied of the excess slurry, then placed under a second cavity and exposed to radiation of a second set of microwave sources during a relatively short time $t_3$. Simultaneously, the interior of the mold is ventilated by a source of relatively cold pulsed air at a temperature $\theta_3$. The evacuation of the moisture of the paste, raised to and kept at the temperature $\theta_1$, is carried out as much by absorption in the mold as by evaporation of the water brought to the internal surface of the paste. The speeds of the migration of the moisture in the two cases are proportional to the temperature differences $(\theta_1 - \theta_2)$ and $(\theta_1 - \theta_3)$. The simultaneous use of two methods of evacuation of the water reduces the quantity of moisture absorbed by the mold and facilitates its own later drying. After hardening of the paste, the objects become sufficiently rigid and are removed from the mold in a known manner.

According to a variation of the invention, the first and second cavities as well as the first and second sets of microwaves sources are combined, the two operations of setting and hardening of the paste having different durations $t_1$ and $t_3$.

In a preferred embodiment, the apparatus has the following characteristics. Each of the first and second cavities include a metallic enclosure open at its base which can be raised and lowered vertically. In the lower position the cavity comes into direct contact with a metallic plate to provide a microwave radiation - tight closure using a metallic braid fixed to the open edges of the cavity. The microwaves sources are made up of generators such as magnetrons coupled to the cavity by known circuits and stirrers. The couplings are disposed on the vertical portions of the cavity in such a way that the distribution of the microwave energy inside the slurry or paste is as even as possible. Pulsed air ventilation devices or regulatable output are placed on the roof of the cavity to ventilate the interior of the mold or molds during the hardening operation. A timed programmer regulates the duration of the various mechanical operations and the operation of the microwave sources. Security units prevent the operation of the generators as long as the cavity is not lowered and in good electric contact with the metallic plate.

According to another feature of the invention, the starting of the process is assured by a continuously operating installation which allows the use of molds in a closed circuit. The sequence of operation includes a casting station at which the filling of a set of $p$ molds with the slurry is carried out, the operations lasting a time $t_1$; a first station for heating of the slurry including a first cavity provided with a first set of microwave sources, in which the $p$ molds remain exposed to the radiation during the time $t_1$; a station for setting of the paste including a chamber in which the $p$ molds are subjected on the outside to a controlled ventilation by cold pulsed air for a duration $t_2$ equal to $n\, t_1$, $n$ being an integer; a second station for heating the set paste, including a second cavity supplied with a second set of microwave sources, in which the $p$ molds remain exposed to the radiation during the same time $t_1$ whilst a second regulatable ventilation device applies cold pulsed air into the inside of each of the $p$ molds; a station for removal from the molds, at which the $p$ samples of sufficiently rigid ceramic objects are removed from their $p$ molds and fed toward a station for further treatment outside the scope of the invention, the operation of removal from the molds also having a duration equal to $t_1$; a drying station for the molds including an oven tunnel with heated air ventilation, the duration of passage of the molds in this station being $t_4$ equal to $m\, t_1$, $m$ being an integer. The molds, in batches of $p$, lastly pass to the cooling station and the cycle is closed.

According to the above description, the molds of a batch pass through the complete cycle in a time $T$ defined by $T = (5+n + m)t_1$. The number of molds in circulation in the closed circuit is equal to $(5 + n + m)p$. The number of hardened pieces which come out of the mold removal station is equal to $p$ during a time $t_1$. Knowing the hourly output for a desired production, it is possible to calculate $t_1$ and consequently, if the mass of slurry to be heated under the first cavity and the mass of paste to be hardened under the second cavity are known, the powers of the first and second sets of microwave sources can be determined.

The objects and advantages of the present invention will become more apparent from the following description of particular embodiments taken in relation to the accompanying drawings.

DESCRIPTION OF THE PREFERRED EMBODIMENTS

Figure 1:
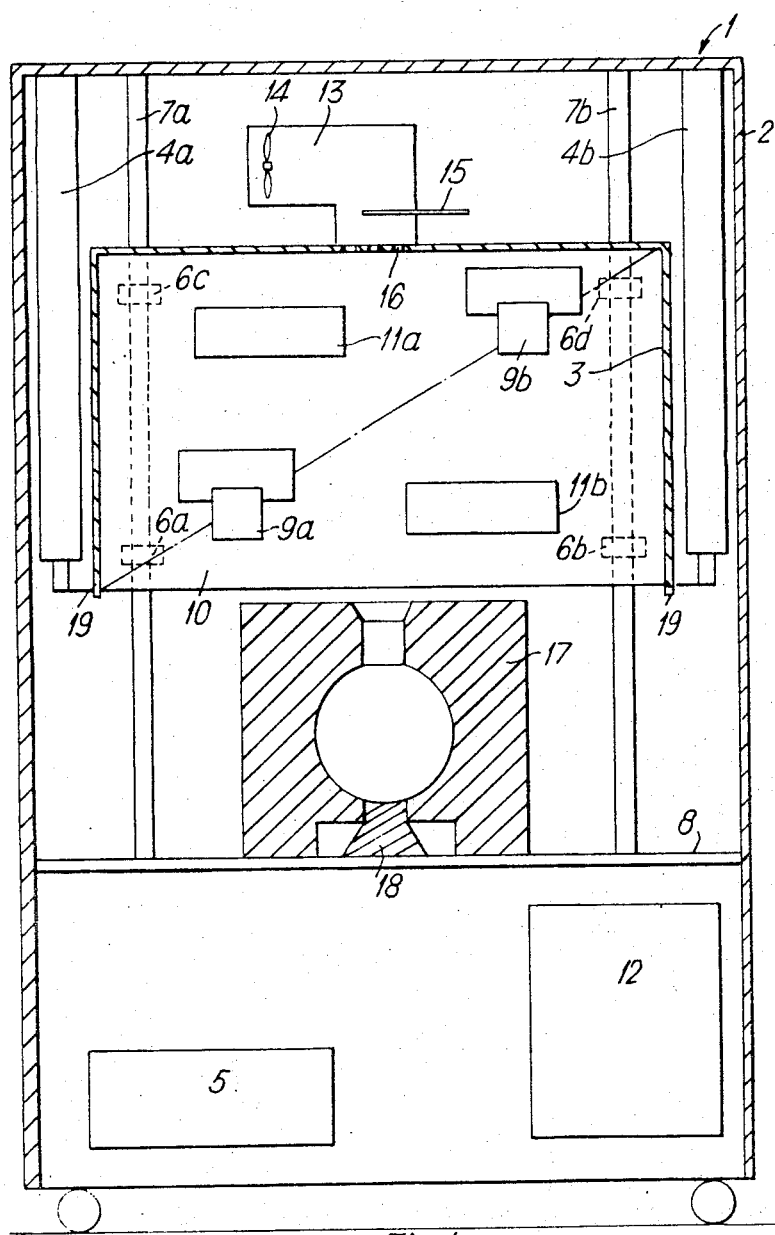
FIG. 1 schematically shows a view in elevation of a microwave heating apparatus for a process according to the present invention.

In FIG. 1, the microwave heating apparatus 1 is made up of a metal framework 2, mounted on wheels, with locking means in order to selectively permit movement to the different working stations. Inside this framework 2 is a metal cavity 3 of parallelepiped form, open at the lower end. The cavity 3 is of duraluminum or other good conducting material. Its dimensions are adapted to those of the plaster molds and in any case, are greater than the wavelength of the microwave frequency used. The cavity 3 is raised and lowered by hydraulic screws 4a and 4b, fed by a hydraulic group 5 situated in the lower part of the apparatus. Cavity 3 is guided in its movement by ball guides 6a, 6b, 6c, 6d sliding on two shafts 7a and 7b.

A loading platform 8 of duraluminum, or another other good conducting material, serves as the bottom of the cavity 3 when the latter is in a lowered position. On two of the opposite vertical faces of the cavity 3 are disposed microwave sources 9, such as 9a and 9b on the front face 10 and 9c and 9d (not shown) on the rear face opposite to 10. Each source 9 comprises a magnetron associated with a microwave circuit coupled to the corresponding cavity by an opening. In front of this opening in the interior of the cavity 3, is a stirrer (not shown) having moveable reflectors in the form of turning plates. Each source includes a magnetron feed 11, such as 11a or 11b fixed on the front face and 11c or 11d (not shown) on the rear face opposite to 10.

A programmed movement control device 12 for the different elements of the apparatus 1 is placed, like the hydraulic group 5, in the lower part of the apparatus 1. A pulsed air ventilation device 13 comprising a ventilator 14 and a shutter 15 directs a flow of air of regulatable output to the inside of the cavity 3a. The aerodynamic coupling between 13 and 3 is through a multitude of small holes such as 16 pierced in the roof of the cavity 3. The linear dimensions of these holes (called "cut-off" holes) are less than the microwave length used so that the losses of microwave energy outside the cavity may be negligible.

The platform 8 is intended to support the mold or molds containing the slurry or paste to be treated. FIG. 1 shows a plaster mold 17 made of several parts assembled by means of joints. The internal form of 17 is the external form of the ceramic object to be reproduced.

A plug 18 of low microwave loss dielectric material closes the lower part of 17 and prevents the loss of the slurry.

When a single mold 17 is used, as shown in FIG. 1, the cavity 3 is provided with only a single ventilation device 13 and the vertical axis of 17 traverses the roof of 3 at the geometric center of the set of cut-off holes 16. If the platform 8 is intended to support several similar molds 17, the roof of 3 has as many ventilation devices as there are molds, the axis of each of the molds traversing the roof at the geometric center of the set of cut-off holes 16 associated with the corresponding device 13.

When the cavity is lowered, it comes into contact with the platform 8 through a metal braid fixed on the free lower edges of the cavity 3. When the pressure force of 3 on 8 is sufficient, the braid 19 ensures the tightness of the interior of 3 to the microwave fields. The loss to the exterior is then very small. The pressure is measured by means of a dynamometer, not shown, and the programmed control device 12 permits the sources 9 to operate only if this pressure is adequate.

Figure 2:
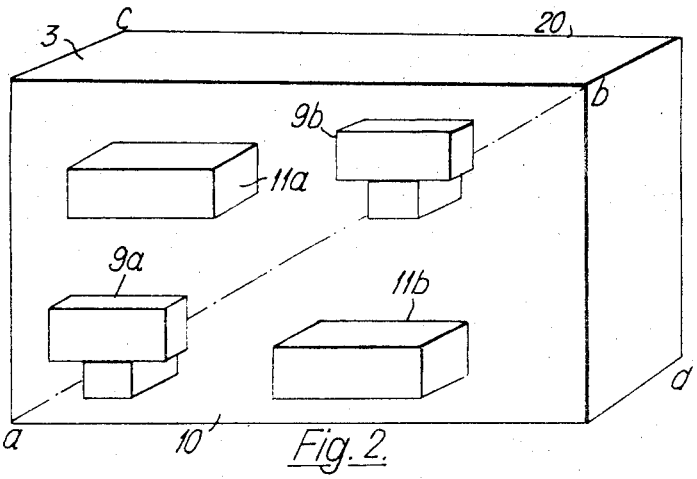
FIG. 2 schematically shows the disposition of the microwave sources in the cavity of the apparatus of FIG. 1.

Reference is now made to FIG. 2 which shows an outline of certain elements of FIG. 1, especially sources 9a and 9b and their respective feeds 11a and 11b fixed on the front face of the cavity 3. It is noted that the sources 9a and 9b are situated approximately on the diagonal a–b of the face 10 at mid-distance between the center of this face and each of the apices a or b.

On the face 20 opposite to 10 are other elements not shown, sources 9c and 9d as well as their respective feeds 11c and 11d. The sources 9c and 9d are situated approximately on the diagonal c–d of the face 20 at mid-distance between the center of this face and each of the apices c or d.

Figure 3:
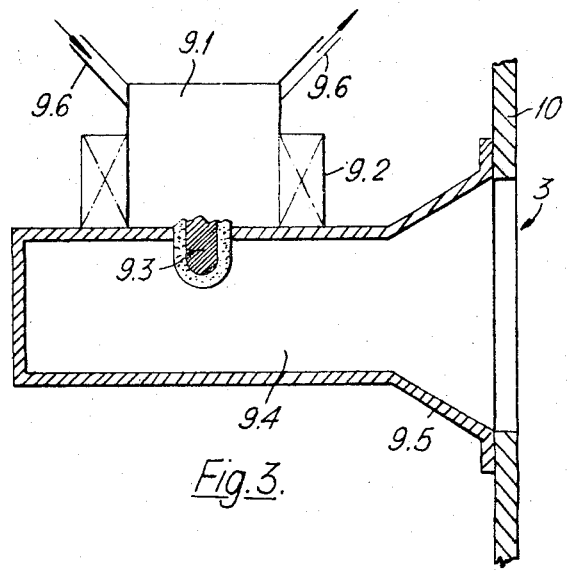
FIG. 3 shows a known example of coupling between the microwave sources and the cavity of the apparatus.

FIG. 3 is a partial section of a known embodiment of one of source 9. The magnetron 9-1, provided with its magnet 9-2, is terminated by the antenna 9-3 which couples 9-1 to the microwave circuit 9-4. 9-4 is made up of a section of wave guide short-circuited at one end and open at the other through a flare 9-5 into the cavity 3. Pipes 9-6 serve to circulate cooling water for the magnetron 9-1.

Figure 4:
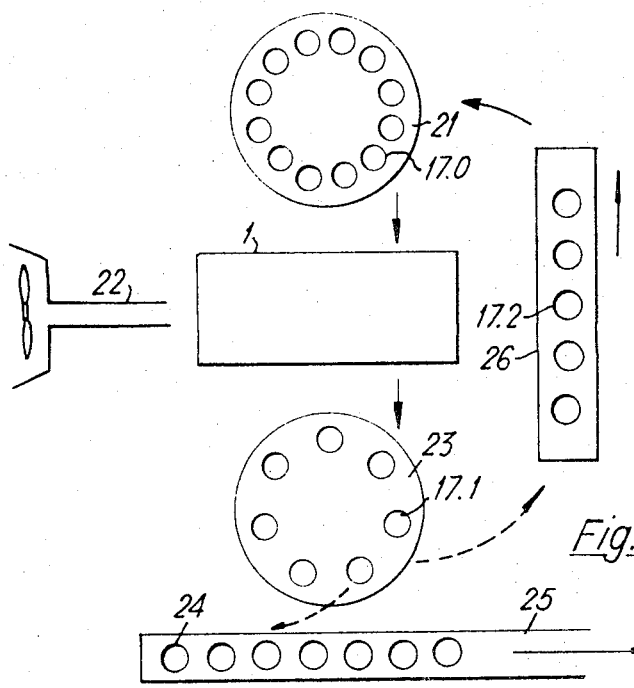
FIG. 4 is a schematic of an assembly installation for the process including a single microwave heating apparatus.

FIG. 4 shows a functional schematic of an installation according to the invention comprising a single microwave heating apparatus having the structure just described according to FIGS. 1, 2 and 3. In FIG. 4 this microwave heating apparatus is numbered 1 and the molds to be treated are designated 17 as in FIG. 1. 21 shows a roundabout platform carrying a certain number of molds 17-0. 22 is a pulsed air ventilation device which ventilates the molds when the cavity of 1 is raised. 23 is an area for removal of articles from the molds 17-1 coming from the apparatus 1 after treatment. The ceramic pieces from the molds 17-1 are disposed on a first cover 25 which transfers them towards the stations of following operations. The molds 17-2 lifted from 23 are placed on another conveyor belt 26 which returns them, after suitable drying by ventilation, towards the roundabout 21 where they are made ready for a new cycle of operation.

A cycle of setting of the slurry and of hardening of the paste in one or more molds will now be described according to the invention, as shown in FIGS. 1 to 4. One or more molds are filled with slurry on the roundabout 21. The molds are introduced manually or by mechanical means on to the loading platform 8 of the apparatus 1. The operator starts the cycle of operation by lowering the cavity 3 by means of screws 4a and 4b actuated by the hydraulic group 5. An electro-optical security device prevents this descent if there is no load on the platform 8. When the cavity 3 comes into contact with 8, a pre-regulated pressure is applied to the assembly of 3 to provide tightness to the microwave fields by means of the metal braid 19. At this moment the feeds 11 (11a, 11b, 11c, 11d) enter into operation and voltage applied to the magnetrons of the source 9 (9a, 9b, 9c, 9d) for a predetermined time $t_1$ controlled by a timing mechanism in the control assembly 12. During the time $t_1$ the sources 9 supply microwave power $P_1$ to the set of molds and the slurry.

When the time $t_1$ has elapsed and the magnetrons cease operation, the cavity 3 rises to take up its starting position. The ventilation device 22 then enters into action and during a time $t_2$ clearly longer than $t_1$, directs cold air to the external surface of the mold or molds at a predetermined flow. At the end of the time $t_2$ the mold or molds 17-0 are emptied of the excess slurry by withdrawing the plugs 18 in the waiting molds placed on the roundabout 21. The empty mold or molds having an interior layer of paste with the outline of the ceramic object or objects, are replaced on the platform 8. Again the cavity is lowered and the contact between 3 and 8 is verified. At this moment the feeds 11 enter into operation and voltage applied to magnetrons of the source 9 for a time $t_3$ determined by means of the timing mechanism in the control assembly 12. During the same time $t_3$ the ventilation device or devices 12 send forward a flux of cold pulsed air of a predetermined output into the interior of each of the molds. When the time $t_3$ has elapsed, the magnetrons cease to operate, the ventilation device or devices 13 are stopped and the cavity 3 rises again to take up its starting position. The hardening of the paste is finished. The mold or molds 17-1 are then carried to the area of mold removal 23. The outline or outlines of removed objects 24 which are sufficiently rigid, are placed on the platform 25 to be fed towards other treatment stations such as for drying. The elements of the mold or molds 17-2 are placed on the second platform 26, subjected to drying ventilators and returned towards the roundabout 21 to be used in a new cycle of operations.

The installation for setting the process into operation is first used in the laboratory to determine the orders of magnitude of the times $t_1$, $t_2$ and $t_3$, the microwave power $P_1$ and the outputs of the ventilation system 13 and 22 for an object of given dimensions. The microwave heating during the time $t_1$ is for the purpose of raising the slurry to a temperature $\theta_1$, of the order of 65° C, a value which should not be exceeded in order to avoid degradation by physicochemical transformation of the slurry as well as of the plaster of the mold in contact with it. At the start of the operations, the molds are, if not dry, at least only slightly moist and, taking into account the selective effect of microwave heating, it is principally the slurry which absorbs the microwave energy radiated in cavity 3 by dielectric losses in the water.

The slurries have very variable compositions according to the ceramic object to be obtained. In practice, to fix an order of magnitude, the proportion of water is about 40 percent. The mineral components (kaolin, clay) have a specific heat which is approximately equal to two tenths that of water, consequently the mean specific heat of the slurry is near 0.5 calories per gram. Ideally, the microwave energy will be used to heat solely the slurry from the ambient temperature, of for example 25° C, to the temperature $\theta_1$ of 65° C, or a temperature increase of 40° C. Such heating requires a contribution of heat per kilogram of slurry equal to $2.10^4$ calories corresponding to an absorbed microwave energy of 85 kilojoules or again expressed in kilowatt hours: $24.10^{-3}$ kW.h.

If it is desired to carry $a$ kilograms of slurry to 65° C during a time $t_1$ expressed in minutes, the power supplied by the set of microwave sources 9 must be at the minimum equal to $1.44\ a/t_1$ kW. In reality, if account be taken of 25 percent losses in the walls of the cavity 3 and in the imperfectly dry mold or molds, the real power $P_1$ which the sources should supply is $P_1 = 1.8\ a/t_1$ kW (equation A). By way of example if $a = 20$ kg and $t_1 = 10$ minutes, we find $P_1 = 3.6$ kW, the power which, as FIG. 1 shows, is obtained from four sources each using a magnetron of 1 kW of effective microwave power.

During the time $t_1$, the mold slowly absorbs the water of the slurry. Lastly, during the time $t_2$, when the action of microwave energy is interrupted and the cavity raised, the exterior of the mold or molds is cooled by ventilation of relatively cold air at the temperature $\theta_2$ by means of the ventilator 22. The migration of the water of the slurry towards the porous plaster of the mold is much more rapid as the temperature gradient $\theta_1 - \theta_2$ increases. The operation of the setting of the slurry is finished when the layer of pasty ceramic deposited on the internal surfaces of the mold or molds attains the desired thickness. After the emptying of the excess slurry, the quantity of water contained in the molds-paste set is clearly less then that contained in the initial slurry. During the hardening operation, the action of the microwave energy should essentially be intended to heat the paste to the neighborhood of 65° C in a manner to favor the migration of the water towards the plaster of the mold or molds.

The process of evacuation of water is accelerated by ventilating the inside of each mold by means of the ventilation device 13 by relatively cold pulsed air (FIG. 1). The evaporation of water by the internal surface tends to recool the paste in such a way that the microwave energy to be supplied to keep the paste at the temperature of 65° C is near to that which has been used during the previous heating to set of the slurry. In other words, the two periods of microwave heating in the operations considered can be of equal duration ($t_1 = t_3$) for the same microwave power $P_1$. The apparatus 1 of FIG. 1 can then be used without modification of the power of the sources 9, the sole difference residing in the fact that the ventilation device 13 does not operate during the duration $t_1$ of the heating of the slurry.

In a typical production line it is preferable to use an installation with continuous operation which allows use of the molds in closed circuit. The installation comprises two microwave apparatus like that shown in FIG. 1, one for heating of the slurry and the other for the hardening of the paste. In fact, each apparatus 1 can contain several molds 17. The cavities 3 are elongated parallelepiped, the molds being aligned side by side in the longitudinal direction. The input of pulsed air provided by a ventilation device such as 13 is arranged vertically with respect to each mold. The platform 8 is replaced by the plane metallic surface of a carriage which carries the molds to be treated and can be successively disposed under each of the cavities 3 of the two apparatus 1.

Figure 5:
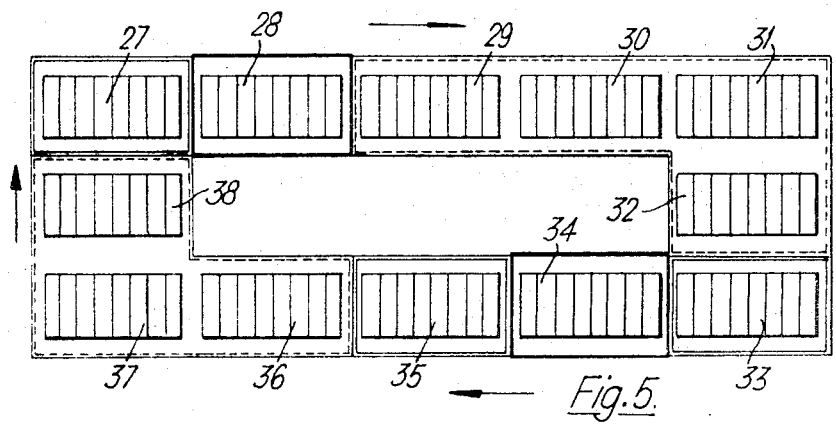
FIG. 5 is a schematic of another assembly installation employing two microwave heating units.

FIG. 5 schematically shows an assembly of such an industrial installation. Each rectangle represents a treatment station for a load of $p$ molds carried by a carriage which circulates clockwise and stops during a time $t_1$ at each station. The carriages succeed one another at the input and output of the installation at the rate of one carriage per period of duration $t_1$. 27 represents the pouring station where a suitable known process is used to fill the $p$ molds with slurry. 28 represents a first microwave heating apparatus in which the slurry contained in the molds is raised to a suitable temperature without ventilation by pulsed air. 29, 30, 31 and 32 represent four stations for setting of the slurry. During their stay at these stations, the molds are subjected to a regulatable ventilation by relatively cold pulsed air. The number of setting stations, in general, is equal to $m$, the total time of stay of the molds at these stations being $m\ t_1$. 33 is a station for the emptying of the slurry remaining after the setting. The emptying processes are known and can be automatic or manual. 34 represents a second microwave heating apparatus in which the molds remain exposed to the microwave radiation whilst each of the $p$ ventilation devices placed on the roof of the cavity of the apparatus direct an amount of relatively cold pulsed air to the interior of the mold placed vertically below. 35 is a station for removal of the material from the mold. The $p$ outlines of objects of each load having become rigid enough, are then taken from their $p$ molds and directed toward other stations to be submitted to further treatment beyond the scope of this invention. 36, 37 and 38 represent three stations for drying of the empty molds. This may be, for example, a tunnel oven with hot air ventilation. Generally the number of drying stations for the empty molds is equal to $n$ and the total time of stay of the molds in these stations comes to $n\ t_1$. It is noted that the load of molds leaving 38 is used again for a new cycle of operations in the casting station 27.

The characteristics of the installation of FIG. 5 are easily determined as soon as the surface dimensions of each station, the hourly output of production of hardened objects and the mass of slurry poured into each mold at the start, are fixed. If $t_1$ is expressed in minutes there results:

$$N = 60p/t_1 \quad \text{(equation B)}.$$

On the other hand, if a is the mass of slurry contained in each mold, the microwave power to be supplied by the sources of the first apparatus (station 28) should be equal, according to equation A, to:

$$P_1 = 3.10^{-2}\ aN \text{ kilowatts}.$$

Experience shows that the microwave power $P_3$ to be supplied by the sources of the second apparatus (station 34) is also approximately equal to $P_1$. It is also possible to compensate for inevitable variations, either by regulating the output of the ventilation of the insides of the molds during the stay in station 34, or to utilize sources more or less powerful than those used in station 28, or when possible, to reduce the time of exposure to the microwave radiation in station 34.

The values of m and n are determined experimentally. The number of molds necessary for a complete cycle amount to $(5 + n + m)p$, the quantity between brackets representing the number of stations of the installation of FIG. 5. As a practical example, for the hourly production of 48 pieces of water closet bowls, each bowl needing a mass of slurry of 10 kg and the length of each station not to exceed 3.50m, there is found:

$$P_1 = 15 \text{ kW}.$$

Taking account of the dimensions of the molds which are aligned in the direction of the length of the cavities of the two microwave apparatus of the installation, the number $p$ is equal to 8. $t_t$ according to equation B amounts to 10 minutes. The number of molds necessary with $n = 4$ and $m = 3$ is equal to $12 \times 8 = 96$. The duration of the complete set of operations of pouring, heating of the slurry, setting of the slurry, emptying of the excess slurry, hardening of the paste and removal from the mold for each sample of water closet bowl amounts to $(5 + n)t_1$, or in this case 90 minutes. The same operations last a total of 7 hours and a half in older industrial installations being used by ceramic manufacturers. Consequently, an hourly production of 48 samples of bowls by prior processes without use of microwaves would need 360 molds or about four times more than in the present installation according to the invention.

Another advantageous aspect of the proposed process resides in the considerable reduction of ground surface of the equipments. This surface is 120 $m2$ for the installation using the present process and 1400 $m2$ for that in processes not employing microwave energy. Lastly an important advantage is in the nature of the ventilation in the two cases. In most modern installations referred to above, the molds are subjected to intense pulsed air ventilation at a temperature close to 55° C for several hours during the period of hardening of the paste. In the present case, the external ventilation is used only at the stations for setting of the slurry and its takes place with air at the room temperature of the workshops. The ventilation of the interior of the molds, at the hardening station, is also done with air at the ambient temperature and is of a relatively low output. If the drying of the molds after removal of the pieces is considered, due to ventilation by pulsed air, there is a difference in temperature in the two cases of about 30° C. In addition, the drying stations occupy a relatively small surface in the present installation in comparison with much larger areas in the other cases.

Referring back to FIGS. 1 and 2, a preferred method of embodying the invention will be described which relates to the number and the particular disposition of the microwave sources 9 placed on the two vertical opposed boundaries 10 and 20 of cavity 3. It is necessary, particularly for proper hardening, to have a temperature which is nearly equal at all points of the paste. Otherwise there is a risk of cracking and warping of the ceramic object which would be irreparable. The microwave heating power must therefore be distributed properly throughout the elements to be heated. One well known device for this purpose is the introduction into the microwave cavities of movable reflectors called "stirrers" which act as field equalizers or wave mixers and limit the effects of stationary waves. A second means, according to the present invention, which should preferably accompany the first, is the use of s independent sources in place of one only. At any point whatever inside a cavity, the s microwave electric fields combine with incoherent phases to reduce the appearance of stationary waves. It is preferable to make s as high as possible.

Figure 6:
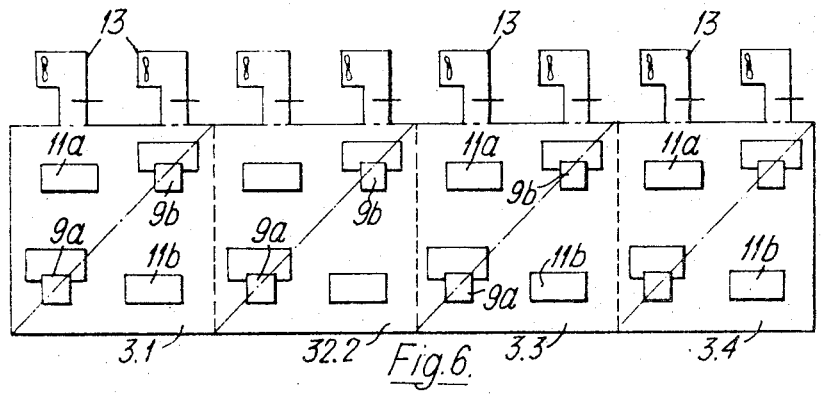
FIG. 6 schematically shows a cavity provided with microwave sources usable in the installation of FIG. 5.

With reference to FIGS. 1 and 2, the mold 17, loaded with slurry or ceramic paste deposited on the internal surfaces, provides absorption of radiation from source 9 with little reflection. To obtain homogeneity of heating it is thus first necessary to dispose the sources equally on each of the opposed faces 10 and 20 of cavity 3. This avoids a screen effect which could result in dissymmetry in the distribution of the sources. Experiences shows that it is not necessary to place the sources on the two other vertical sides of the cavity 3. The disposition of the sources 9a and 9b on the face 10 on the one hand, and the sources 9c and 9d on the other hand, such as previously described is one example of an apparatus 1 according to the invention. This is particularly useful for casting of an object of oblong form or of two objects of circular form where the molds are placed side by side during the treatment. For the preparation of a greater number $p$ of like objects, a cavity such as shown in FIG. 6 is preferable, in which the $p$ molds are aligned along the length of the cavity. As far as the distribution of the sources on the front and rear faces is concerned, this cavity can be considered as resulting from the joining of several identical cavities 3-1, 3-2, 3-3 and 3-4 like that of FIG. 1, with the common boundaries having been eliminated. Each cavity carries the ventilation devices 13 on its roof to the number of one per object treated.

Although the principles of the present invention may have been described above in relation with a particular embodiment, it will be clearly understood that this description is made only by way of example and does not limit the scope of the invention as set forth in the appended claims.

What we claim is:

1. Apparatus for molding ceramic articles comprising:
    a heating chamber,
    a plurality of sources of microwave radiation in said chamber,
    a source of ventilating air in said chamber,
    means for regulating the flow of said air,
    a mold,
    a platform adapted to support said mold filled with a slurry of ceramic material within said chamber,
    means for lowering and raising said chamber,
    means for applying radiation from said microwave sources in the lower position of said chamber for a first predetermined time to heat the material within said chamber to a first predetermined temperature and at a later time to reheat and harden the material,
    means for interrupting said microwave sources in the raised position of said chamber, means for directing a first flow of air onto said mold in the raised position of said chamber for a period of time longer than said first time and of a temperature lower than said first temperature to set the material, and means for directing a flow of air within said mold in the lowered position of said chamber simultaneously with the application of said radiation at said later time at a temperature lower than said first temperature.

2. The apparatus of claim 1, wherein said sources of microwave radiation are disposed on opposed surfaces of said chamber to provide relatively even distribution of radiation and heat.

3. The apparatus of claim 1, including a plurality of successive work stations and means feeding a plurality of molds filled with ceramic material successively to said stations, said stations including two heating chambers each having a source of microwave radiation, said first chamber including means for applying microwave radiation for said first time at said first temperature, a second station including said means for directing said first flow of air external to said molds, said second heating chamber including means for applying microwave radiation at said later time and said means for directing said flow of air within said molds.

4. The apparatus of claim 2 wherein said means for regulating said flow of air includes a shutter adjacent said source of air supplying a flow of pulsed air.

* * * * *